July 29, 1947.   O. H. BERNKULL   2,424,647
ANTISKID DEVICE
Filed May 27, 1943

INVENTOR
O. H. BERNKULL
BY
ATTORNEYS

Patented July 29, 1947

2,424,647

UNITED STATES PATENT OFFICE 2,424,647

ANTISKID DEVICE

Oscar Harald Bernkull, Goteborg, Sweden

Application May 27, 1943, Serial No. 488,712
In Sweden March 23, 1940

2 Claims. (Cl. 152—210)

This invention relates to improvements in antiskid devices for vehicle wheels and especially those utilizing tires, and more particularly the invention is concerned with devices of the kind wherein the anti-skid elements are placed in apertures provided in the tire tread members.

One object of the invention is to provide a device of the character described which has a high efficiency against sliding and at the same time is very cheap to manufacture.

Another object of the invention is to provide an anti-skid device which easily can be placed in the elastic material of the tire and held in position therein.

Further objects of the invention will be set forth in the following description.

The invention is illustrated in the accompanying drawing in which.

Figure 4:
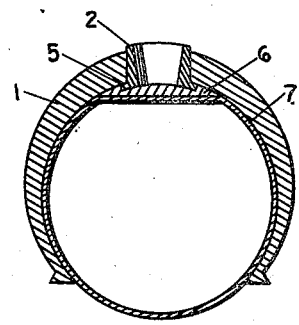
Figure 4 is a cross section view of a motor car tire provided with the anti-skid device in one embodiment.

In the embodiment shown in Figure 4 the anti-skid device is shown applied to the normal rubber tire 1 of a motor car wheel or the like. The tread portion of the tire is provided with one or more rows of through-going apertures into which anti-skid elements are inserted from the inside. These anti-skid elements consist of a hollow annular frusto-conical rim-like part 2 for instance of hard steel tube with a holding flange 5 which rests against the inside of the tire. A betweenlayer 6 can be placed between the tire 1 and the inner air tube 7.

Figure 1:
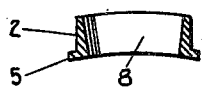
Figures 1, 2 and 3 are cross section views of an anti-skid element in three slightly dfferent shapes.
Figure 2:
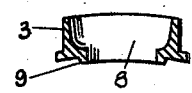
Figure 3:
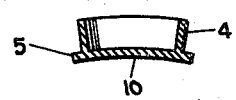

As shown in Figures 1, 2 and 3 the metal rim-like part 2 can be slightly modified in its shape. The part 2 in Figure 1 has a throughgoing hole 8 as also is the case with the part 3 in Figure 2. The latter part 3 is however provided with an inner edge 9 which helps to prevent the part from tipping. In Figure 3 the hole in the part 4 is closed by a bottom plate 10. All the metal parts 2, 3 and 4 are inserted into the apertures in the tire in such a way that they strengthen the side wall of the aperture.

Figure 5:
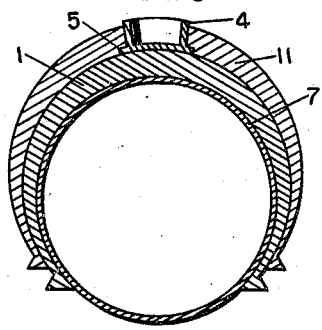
Figure 5 is a corresponding cross section view with the anti-skid device in a further embodiment.

In the embodiment of Fig. 5 the anti-skid device consists of an extra rubber tire 11 placed around the normal tire 1 of the car wheel without any holding means. This extra tire 11 is provided with frusto-conical parts 4 of the type shown in Fig. 3. The tire 11 is mounted when the inner air tube 7 is deflated, and will be automatically held in place when the air tube is inflated under air pressure.

When the wheel with the anti-skid device is on a slippery road the outer ring shaped ends of the metal parts will be pressed into the road with a strong grip and prevent the car from skidding. All the rim-like parts are placed in the tire without any holding means such as screws, bolts or the like, the metal-parts being inserted from the inside of the tire. The metal parts are held in position by the pressure of the walls of the apertures and by means of the air pressure of the inner air tube which presses the holding flanges against the inside of the tire. The metal parts strengthen the sidewall of the apertures of the tire and are prevented from moving in the apertures and from tipping when in action. As the metal parts are held in place solely by pressure when the tire is inflated they easily can be replaced when they become worn. The metal parts are very cheap in manufacture and as old tires can be utilized for the arrangement the whole anti-skid device can be used by everyone at very low costs. As no holding means are used other than the flanges the mounting of the anti-skid device will be convenient and cause no trouble.

I claim as my invention:

1. In combination, a tire tread member having apertures therein, an annular frusto-conical metallic rim-like part inserted in each aperture and of such axial length as to project from the tread surface of the tire member, an external flange on the relatively small end of each rim-like part engaging the interior of the tire member preventing outward displacement of said part.

2. An arrangement as claimed in claim 1 provided with a plate disposed substantially in the plane of said flange and joined with the small end of the rim-like part.

OSCAR HARALD BERNKULL.

REFERENCES CITED

The following references are of record in the file of this patent:

UNITED STATES PATENTS

| Number | Name | Date |
| --- | --- | --- |
| 792,673 | Smith | June 20, 1905 |
| 815,430 | Jeffery | Mar. 20, 1906 |
| 1,230,508 | Peden | June 19, 1917 |
| 849,729 | Dunbar | Apr. 9, 1907 |
| 1,092,419 | Adams | Apr. 7, 1914 |
| 1,335,460 | Rich | Mar. 30, 1920 |

FOREIGN PATENTS

| Number | Country | Date |
| --- | --- | --- |
| 596,857 | France | 1925 |
| 661,047 | France | 1929 |
| 3,913 | Great Britain | 1906 |
| 5,716 | Great Britain | 1907 |
| 321,742 | France | 1902 |